United States Patent
Horling et al.

(10) Patent No.: US 9,098,502 B1
(45) Date of Patent: Aug. 4, 2015

(54) IDENTIFYING DOCUMENTS FOR DISSEMINATION BY AN ENTITY

(71) Applicant: Google Inc., Mountain View, CA (US)

(72) Inventors: Bryan C. Horling, Sunnyvale, CA (US); Afsaneh Hajiamin Shirazi, San Jose, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/727,865

(22) Filed: Dec. 27, 2012

Related U.S. Application Data (60) Provisional application No. 61/727,179, filed on Nov. 16, 2012.

(51) Int. Cl.
*G06F 3/00* (2006.01)
*G06F 17/30* (2006.01)

(52) U.S. Cl.
CPC ................................ *G06F 17/30011* (2013.01)

(58) Field of Classification Search
CPC .......... G06F 17/3053; G06F 17/30283; G06F 17/30867; G06F 17/30011
See application file for complete search history.

(56) References Cited

U.S. PATENT DOCUMENTS

| | | | |
|---|---|---|---|
| 6,446,061 B1 * | 9/2002 | Doerre et al. ................. | 707/738 |
| 7,912,857 B2 | 3/2011 | Fujikawa et al. | |
| 8,290,902 B1 | 10/2012 | Shaver et al. | |
| 2007/0276821 A1 * | 11/2007 | Aravamudan et al. ............ | 707/5 |
| 2011/0112903 A1 * | 5/2011 | Goldman et al. .......... | 705/14.53 |
| 2011/0197132 A1 | 8/2011 | Escoda et al. | |
| 2012/0084292 A1 * | 4/2012 | Liang et al. .................... | 707/741 |
| 2012/0173625 A1 * | 7/2012 | Berger .......................... | 709/204 |
| 2012/0260155 A1 | 10/2012 | Krieger et al. | |
| 2012/0331108 A1 | 12/2012 | Ferdowsi et al. | |
| 2013/0031208 A1 | 1/2013 | Linton et al. | |

FOREIGN PATENT DOCUMENTS

WO WO2004075466 A2 9/2004

* cited by examiner

*Primary Examiner* — Tarek Chbouki
(74) *Attorney, Agent, or Firm* — Fish & Richardson P.C.

(57) ABSTRACT

Methods, systems, and apparatus, including computer programs encoded on a computer storage medium, for suggesting documents for dissemination. In one aspect, a method includes identifying documents that have each been classified as a document that references a particular entity. An entity score specifying a measure of importance of the particular entity to the document is determined for the documents. A proper subset of the documents is selected, as suggested documents for dissemination by the particular entity based, at least in part, on the entity score. Data that identify one or more of the suggested documents is provided to an online environment maintained by the entity. A dissemination element is provided to the online environment of the particular entity. The dissemination element causes, upon user interaction by the particular entity and with the dissemination element, at least one of the suggested documents to be disseminated to one or more other entities.

21 Claims, 5 Drawing Sheets

IDENTIFYING DOCUMENTS FOR DISSEMINATION BY AN ENTITY

CROSS-REFERENCE TO RELATED APPLICATIONS

This application claims the benefit under 35 U.S.C. §119 (e) of U.S. Patent Application No. 61/727,179, entitled "IDENTIFYING DOCUMENTS FOR DISSEMINATION BY AN ENTITY," filed Nov. 16, 2012, which is incorporated herein by reference in its entirety.

BACKGROUND

This specification relates to data processing and information retrieval.

The Internet provides access to a wide variety of resources such as images, video or audio files, web pages for particular subjects, book articles, or news articles. These resources also include web pages, such as social networking web pages, that are provided by publishers and maintained by users. For example, the users can post (e.g., upload or select) content that the users want on their respective social networking web pages. Each user can also selectively control on a per-user or per-group basis, which other users are able to access at least a portion of the content that the user has posted to their social networking web page.

SUMMARY

In general, one innovative aspect of the subject matter described in this specification can be embodied in methods that include the actions of identifying, by a data processing apparatus, a plurality of documents that have each been classified as documents that reference a particular entity; determining, for each of at least some of the plurality of documents and by the data processing apparatus, an entity score specifying a measure of importance of the particular entity to the document, the entity score being determined, based at least in part, on a number of references in the document to the particular entity, the references including instances of a name of the particular entity; selecting, based on the entity score and as suggested documents for the particular entity, a proper subset of the documents from the plurality of documents; providing, by the data processing apparatus and to an online environment maintained by the entity, data that identify one or more of the suggested documents for dissemination, by the entity, to other online environments maintained by other entities; and providing, to the online environment of the particular entity, a dissemination element that, upon user interaction, by the particular entity and with the dissemination element, causes at least one of the suggested documents to be disseminated to one or more other entities. Other embodiments of this aspect include corresponding systems, apparatus, and computer programs, configured to perform the actions of the methods, encoded on computer storage devices.

These and other embodiments can each optionally include one or more of the following features. Determining an entity score can include, for each of one or more of the documents, determining locations of the references to the particular entity in the document; and determining the entity score based on the number of references and the locations of the references. Determining the entity score can include, for at least one of the documents, determining a first number of the references to the particular entity that are included in the document; determining a second number of references to other entities that are included in the document; and determining, for the particular entity, the entity score of the document based on a function of the first number and the second number.

Methods can include the actions of identifying an additional document that is not included in the proper subset of documents; determining that the additional document is hosted by a website that has been classified as a trusted site based, at least in part, on a quality of documents hosted by the site; determining, based on the references to the particular entity that are included in the additional document, that the particular entity is a primary subject of the additional document; and including the additional document in the proper subset of documents, the inclusion being performed based on the particular entity being a primary subject of the additional document and based on the additional document being hosted by the trusted site.

Methods can include the actions of identifying an additional document that is not included in the proper subset of documents; determining that a title of the additional document includes a reference to the particular entity; and including the additional document in the proper subset of documents, the inclusion being performed based on the determination that the title includes the reference to the particular entity.

Methods can include the actions of identifying an additional document that is not included in the proper subset of documents; determining that the additional document has a traffic spike score that meets a threshold traffic spike score, the traffic spike score for the additional document being a value determined based on a variance of user requests for the additional document over one or more specified time periods; and including the additional document in the proper subset of documents the inclusion being performed based on the determination that the traffic spike score meets the threshold traffic spike score.

Methods can include the actions of obtaining, for each of one or more of the plurality of documents, an information retrieval score for the document relative to the particular entity; identifying a particular document for which the information retrieval score meets an information retrieval threshold; and including the particular document in the proper subset of documents, the inclusion being performed based on the information retrieval score meeting the information retrieval threshold.

Methods can include the actions of determining that two of the documents form the plurality of documents each have a matching document date; determining, based on the entity scores for the two documents, that each of the two documents are eligible for inclusion in the proper subset; and including, based on the documents having a matching document date, only one of the two documents in the proper subset of documents.

Particular embodiments of the subject matter described in this specification can be implemented so as to realize one or more of the following advantages. A user can distribute online information about the user that was published by third parties without being required to actively search for such information. Online information about the user that may not be highly ranked in search results can be provided in a social environment (or another online environment) maintained by the user so that the user can more easily identify this information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Documents (e.g., web pages or other electronic files) that refer to a particular entity, such as a particular person, are suggested to the particular entity for dissemination by the particular entity to other entities. For example, in a social networking environment, a particular user's social environment can be populated with information identifying a set of documents that have been identified as documents that provide information about that particular user. The particular user can then interact with a dissemination element that, in response to the user interaction, causes one or more other users to receive information identifying the documents that the particular user selected for dissemination. Thus, the particular user can inform their social network contacts with information that has been published about the particular user.

An electronic document (which for brevity will simply be referred to as a document) may, but need not, correspond to a file. A document may be stored in a portion of a file that holds other documents, in a single file dedicated to the document in question, or in multiple coordinated files.

In some implementations, the documents that are suggested to a particular entity are selected based on a document's entity score, which for brevity is referred to as an entity score. The entity score relative to the particular entity specifies a measure of importance of the particular entity to the document. As described in more detail below, other attributes associated with a document can also be used to determine the importance of a particular entity to the document. The importance of a particular entity to a document can be based, for example, on whether the particular entity is the primary entity discussed by the document, a number of references to the particular entity that are included in the document, and/or locations of the document at which references to the entity are located. For example, a document that mentions an entity in the title of the document may have a higher entity score for that entity than another document that mentions the entity only in a footnote.

Additionally, as described in more detail below, suggested document selection for a particular entity can include operations that diversify the documents that are suggested to the particular entity. For example, documents can be selected in manner such that documents from different periods of time are suggested to the particular entity instead of suggesting multiple documents from a same time period. Some of the documents that are suggested to the particular entity can be selected based on the entity score while other documents may be suggested to the particular entity based on other criteria, such as whether the document has experienced at least a threshold increase (or decrease) in traffic within a specified period.

An entity can be a uniquely identified person, place, or concept that is represented in a knowledge graph (e.g., a graph that represents relationships between unique entities). Two entities can have a same name and still be uniquely identifiable based on additional publicly available information. For example, a famous actor and a famous snowboarder may share the same name. However, based on additional information in documents that reference one of these entities (e.g., information about a snowboarding event or a movie in which the actor stars) a determination can be made which of these entities is being referenced by the document. Thus, in some implementations, only those documents that are determined to be referencing a particular unique entity will be suggested to that particular entity.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used.

Figure 1:
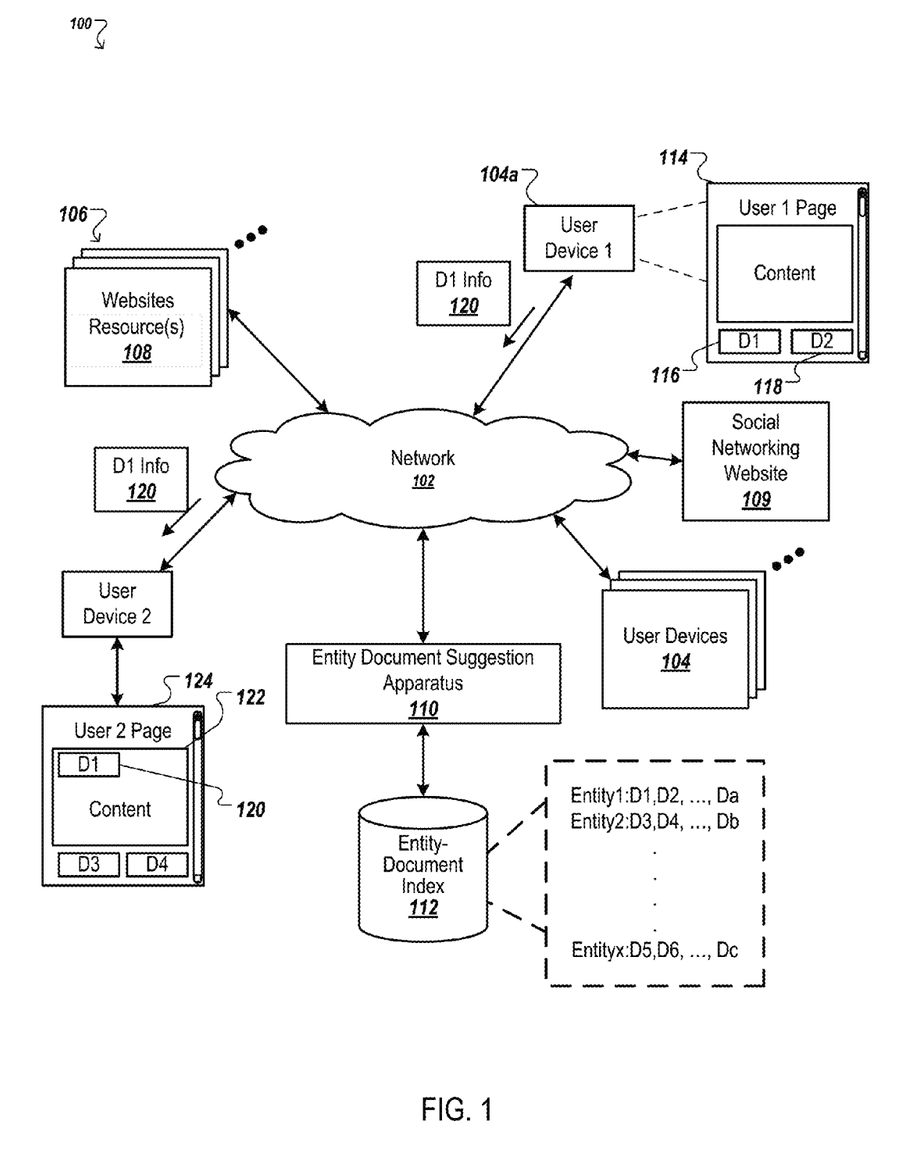
FIG. 1 is a block diagram of an example environment in which content is distributed to user devices.

FIG. 1 is a block diagram of an example environment 100 in which content is distributed to user devices. The environment 100 includes a network 102, such as a local area network (LAN), a wide area network (WAN), the Internet, or a combination thereof over which user devices 104 can access websites 106.

A website 106 is one or more resources 108 associated with a domain name and hosted by one or more servers. An example website is a collection of web pages formatted in hypertext markup language (HTML) that can contain text, images, multimedia content, and programming elements, such as scripts. Each website 106 is provided by a publisher, which is an entity that controls, manages and/or owns the website 106.

A resource 108 is any data that can be provided over the network 102. A resource 108 is identified by a resource address that is associated with the resource 108. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 104 is an electronic device that is under control of a user and is capable of requesting and receiving resources over the network 102. Example user devices 104 include personal computers, mobile communication devices, and other devices that can send and receive data over the network 102. A user device 104 typically includes a user application, such as a web browser, to facilitate the sending and receiving of data over the network 102. A user device 104 can request resources 108 from a website 106, for example, by entering a URL or other network location that is associated with the resource 108 into a web browser, or by the user clicking on a link that redirects the user device 104 to the URL or other network location that is associated with the resource. In turn, data representing the resource 108 can be provided to the user device 104 for presentation by the user device 104.

One type of website 106 from which user devices request resources 108 is a social networking website 109. A social networking website is a website that includes resources that are maintained by users of the social networking website. A publisher of a social networking site 109 (or another website that creates an online community) can host, among other resources 108, web pages (or other resources) that are created by and/or maintained by users that subscribe to the social networking website 109. For example, the publisher of the social networking site 109 can allow a particular user (e.g., user 1 104a) to post content (e.g., input data and/or upload content) that will be available from one or more resources (e.g., web pages) that are reserved for publishing content provided by the particular user.

A user can often selectively grant access to one or more other users that are registered with the social networking site 109. For example, a particular user may select a group of friends or family members with whom they want to share a particular image, while not making that particular image available to co-workers (e.g., by not selecting the co-workers as users that are authorized to view the particular image). Thus, in a social network, such as in a social networking website, a user maintains the web pages (or other resources) that the publisher has reserved for the user by uploading and/or otherwise selecting content that is presented on the reserved resources and/or controlling access by other users to the web pages and/or content.

For purposes of brevity, this document will collectively refer to the resources (e.g., web pages) that are reserved for a user by a publisher (e.g., a social network website owner) as a social environment. A social environment for a particular entity (e.g., a particular user) can include various types of resources. For example, the social environment for a particular user can include a home page that provides the user with various updates about other users that share content with the particular user, an images page at which the particular user can upload images, a profile page at which the particular user can post and/or update information about themselves, and an events page at which the particular user can maintain and/or share a calendar identifying events in which the particular user is interested or will be attending. Other types of pages can also be included in the social environment for the particular user. Additionally, a social environment is used for purposes of example, but the methods and systems described in this document can also be implemented in other online environments.

Users of social networking sites (or other online communities) post content to their social environment (e.g., by inputting, uploading, or otherwise selecting content for publication). These posts can provide other users of the social networking website information about happenings or events in which the posting users are interested. These posts can also inform other users about topics or events that are relevant to the users that posted the content.

For example, if a particular user was recently married, that particular user may input text "Pictures from my wedding day" and upload images from the wedding. In turn, the user can select other users that are authorized to view the text and/or the images that were uploaded.

Sometimes, information about a particular user is published in an online document that may be created by a third party (i.e., an entity other than the particular user). For example, if a particular user is the recipient of a prestigious award, there may be an online news article describing the reasons for which that particular user received the award. Thus, the particular user may be interested in sharing one or more of these documents with other users of a social networking site. However, the particular user may not know that these documents exist, and these documents may not be easily located for one or more reasons.

The environment 100 includes an entity document suggest apparatus 110 that suggests to a particular entity (e.g., a particular social network user) one or more documents about the particular entity for dissemination to other entities (e.g., other social network users). As discussed in more detail below, the dissemination of the document to other entities can include sharing the document (or an active link to the document) in the respective social environments of the other entities.

In some implementations, the entity document suggestion apparatus 110 identifies documents that reference a particular entity from an entity-document index 112. The entity-document index 112 can be stored in a data store and include a set of unique entities and, for each of the unique entities documents that include a reference to the unique entity. For example, as illustrated by FIG. 1, the entity document index 112 includes an entry for entity 1, and indicates that documents D1, D2, . . . , Da are documents that include a reference to entity 1. Similarly, the entity document index 112 includes entries for each of entity 2 and entity 3 and that documents D3, D4, . . . , Db reference entity 2, while documents D5, D6, . . . , Dc reference entity 3. Thus, the entity document suggestion apparatus 110 can identify documents that reference a particular entity (e.g., entity 1) by accessing the entity-document index 112 and obtaining data identifying the documents (e.g., D1, D2, . . . , Db) that are indexed according to the particular entity.

As described in more detail below, the entity document suggestion apparatus 110 selects one or more of the documents that reference a particular entity as suggested documents for dissemination by the particular entity. For example, assume that the entity document selection apparatus 110 selects documents D1 and D2 as suggested documents for user 1. This selection can be based, for example, on an importance of user 1 to the document, which can be determined, based on a number of references to the particular entity that are included in the document, locations in the document of the references to the particular entity, and/or other information (e.g., a number of other entities that are also referenced by the document or a source of the document).

The entity document suggestion apparatus 110 provides suggestion data identifying the suggested documents to an online environment for the particular user. In some implementations, the online environment to which the entity document suggestion apparatus 110 provides the suggestion data is the social environment for the particular entity. For example, the entity document selection apparatus 110 can (e.g., by way of the publisher of the social network site) insert into a social environment page 114 for user 1, information 116 identifying D1 as a suggested document for dissemination by user 1. The entity document selection apparatus 110 can also insert into the social environment page 114 information 118 identifying D2 as another suggested document for dissemination by user 1. Thus, when the social environment page 114 is presented at the user device 104a, the social environment page 114 will include the information 116 and 118 that respectively identify documents D1 and D2 as suggested documents for dissemination by user 1.

In this example, user 1 can elect to make another user of the social network, such as user 2, aware of document D1 and/or document D2. For example, assume that document D1 is a news article about user 1 receiving a prestigious award. In this example, when document D1 is identified in the social environment page 114, user 1 can request that information 120 ("D1 Info") identifying D1 be inserted into the content 122 of the social environment page 124 for user 2. The information 120 can be inserted into the content 122, for example, by the publisher of the social network site 109. The information 120 can include, for example, a reference (e.g., an active link) to document D1 and/or content of D1. The information 120 can also include text or other content that is submitted by user 1 with the request that document D1 be brought to the attention of user 2.

Figure 2A:
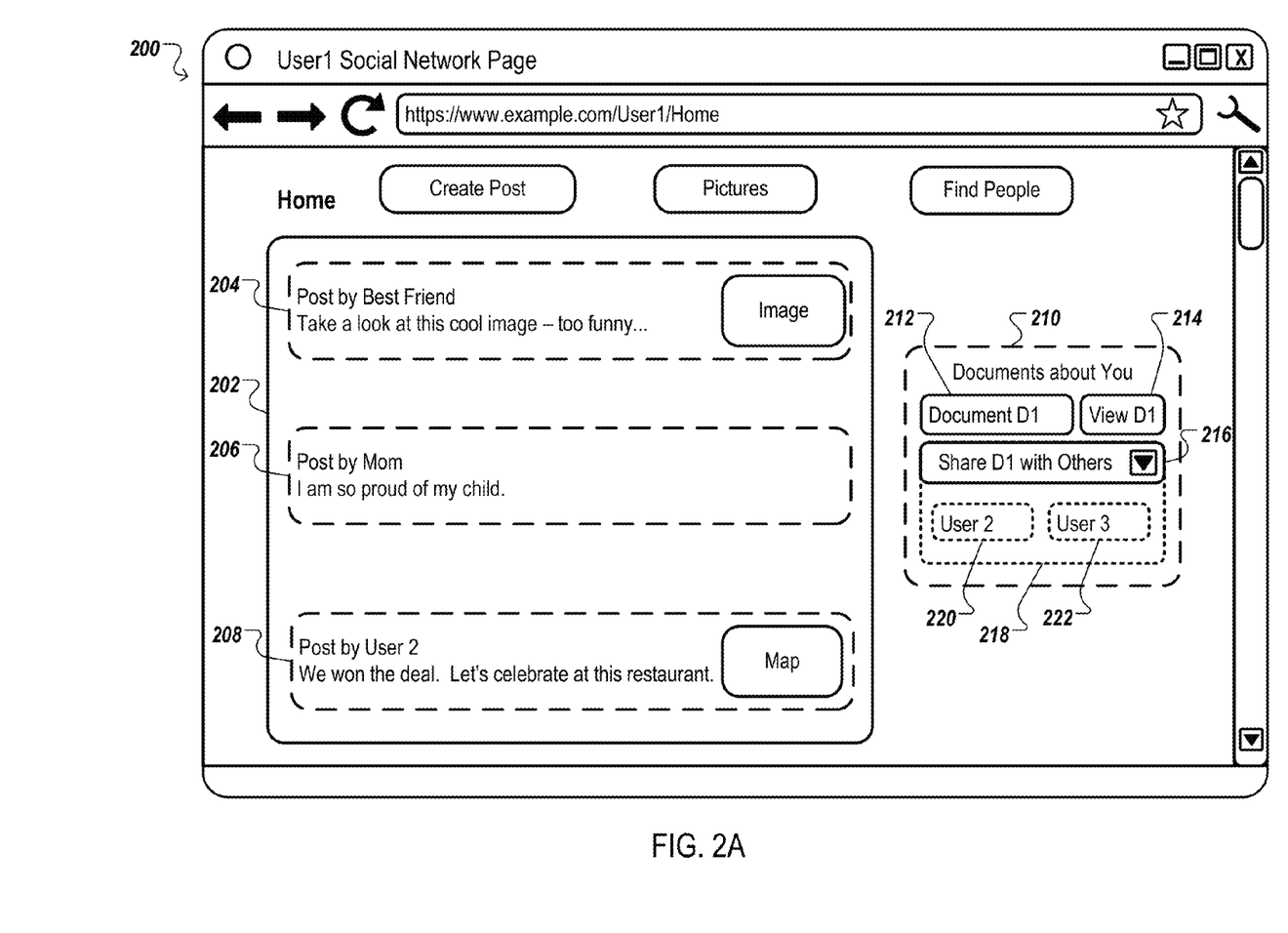
FIG. 2A is a screen shot of an example social environment page in which suggested documents for a particular entity can be presented.

FIG. 2A is a screen shot of an example social environment page 200 in which suggested documents for a particular entity can be presented. As illustrated by FIG. 2A, the social environment page 200 is a social environment page for user 1. The social environment page for user 1 includes a content area 202 in which posts from other users 204, 206, and 208 are presented. These posts 204, 206, and 208 can be, for example, content that other users (e.g., users other than user 1) have uploaded or otherwise published on their own respective social environments. For example, the post 204 may be a post that user 1's best friend has posted on their social environment, while the posts 206 and 208 can be posts that were respectively made on the social environments for user 1's mom and user 2. These posts 204, 206, and 208 may be included in user 1's content area 202 in response to user 1 becoming contacts with these users, requesting notification of posts to these users' social environments, and/or the authorization, by these other users, for user 1 to view their posts.

The social environment page 200 also includes a document suggestion area 210 in which documents about user 1 are identified for user 1. The documents that are identified in the suggestion area 210 are documents that were selected by the entity document suggestion apparatus as suggested documents for dissemination by user 1. For example, as illustrated by FIG. 2, the document suggestion area 210 includes an identifier 212 identifying document D1 as a suggested document for user 1. The selection of the documents that will be identified in the document suggestion area 210 is described with reference to FIG. 3.

The document suggestion area 210 also includes a viewing element 214 with which user 1 can request presentation of the document identified by the identifier 212. For example, user 1's interaction with the viewing element 214 can initiate a request for the document D1 from a network location at which the document D1 is stored. Thus, user 1 can view the document D1 to determine whether they would like to inform other users about this document.

The document suggestion area 210 further includes a dissemination element 216 that enables the user to inform other users about a document that references user 1. In some implementations, user 1's interaction with the dissemination element 216 causes one or more other users to be informed about a document that has been identified in the suggestion area 210. For example, in response to user 1 clicking on the dissemination element 216, a list of users 218 to whom user 1 can disseminate information about the document D1 can be presented.

The list of users that are presented to user 1 can include, for example, users that user 1 has identified as contacts and/or users that have identified user 1 as a contact. For example, with reference to FIG. 2, the list of users 218 that is provided to user 1 in response to interaction with the dissemination element 216 may include one or more of the users (e.g., user 2 220) that created the posts 204, 206, and/or 208 since user 1 has requested to be notified of posts made by these users.

User 1 can select one or more users (e.g., user 2 220 and/or user 3 222) from the list of users 218 that is provided in response to interaction with the dissemination element 216. Selection of the one or more users can cause information identifying the document D1 to be presented in the social environments for the selected users. For example, user 1's selection of user 2 220 from the list of users 218 can initiate a request to insert information identifying the document D1 into user 2's social environment. Upon receipt of this request, the publisher of the social network website can determine that user 1 is authorized to disseminate information to user 2's social environment, and in response to the determination, insert the information identifying document D1 into user 2's social environment.

Figure 2B:
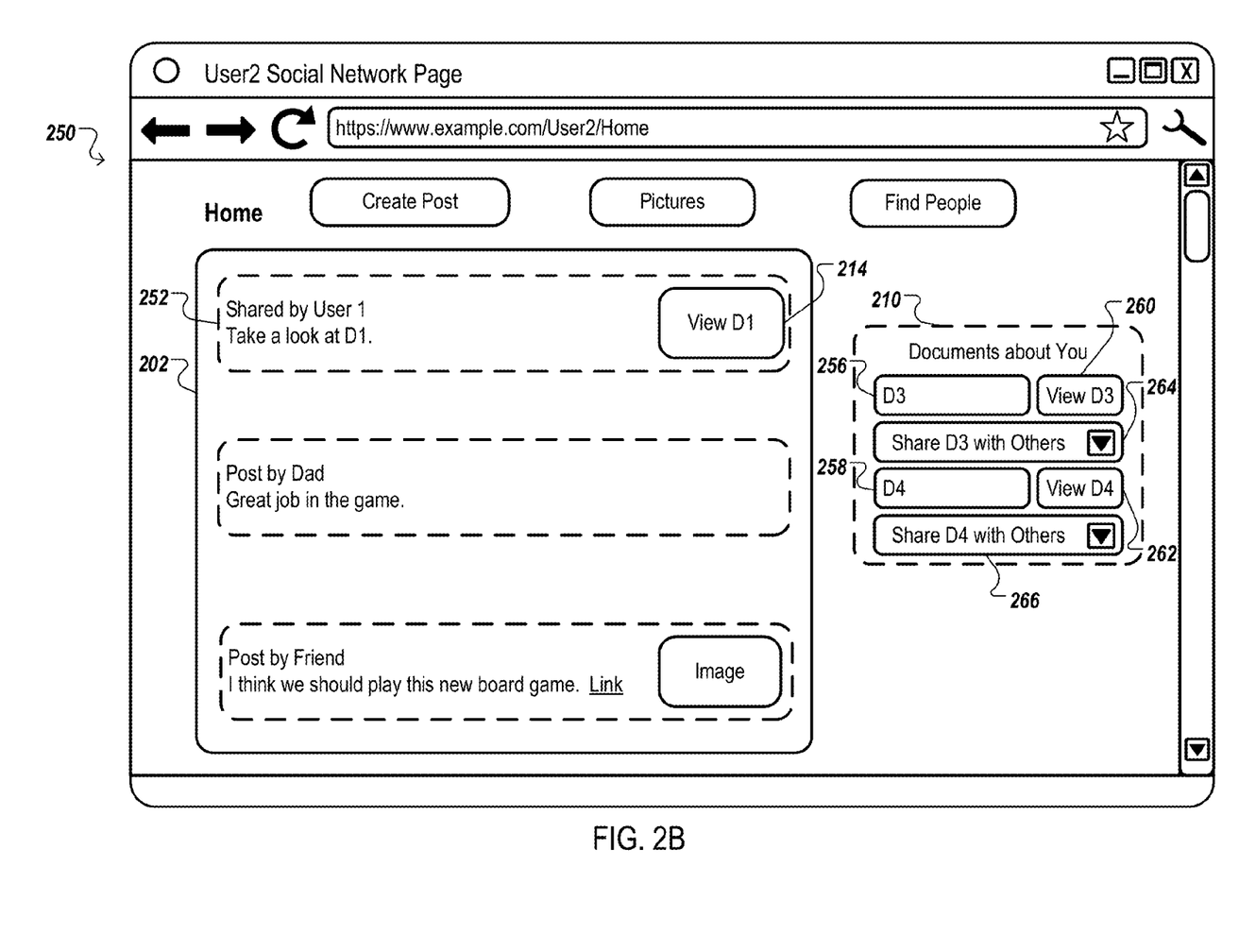
FIG. 2B is a screen shot of another example social environment page for another entity.

FIG. 2B is a screen shot of another example social environment page 250 for another entity. Like the social environment page 200, the social environment page 250 includes a content area 202 and a documents suggestion area 210. The social environment page 250 is a social environment page for user 2, and the content area 202 for user 2 includes a post 252 identifying document D1 for user 2, and indicating that information about document D1 was disseminated to user 2 by user 1. For example, the post 252 includes text 254 indicating that user 1 has shared document D1 with user 2. The post 252 also includes a viewing element 214 that will request presentation of the document D1 in response to user 2 interacting with the viewing element 214. Thus, user 2 can view document D1 by interacting with the information about document D1 that was provided to user 2 by user 1.

As noted above, the social environment page 250 includes a document suggestion area 210 in which documents that were selected by the entity document suggestion apparatus as suggested documents for dissemination by user 2. For example, the document suggestion area 210 for user 2 includes identifiers 256 and 258 that respectively identify documents D3 and D4 as suggested documents for user 2. The document suggestion area 210 for user 2 also includes viewing elements 260 and 262 that respectively request presentation of documents D3 and D4 in response to user 2 interacting with the viewing elements 260 and 262. The document suggestion area 210 for user 2 further includes dissemination elements 264 and 266 that respectively enable user 2 to disseminate information about documents D3 and D4 to other users in a manner similar to that described above with respect to FIG. 2A.

Figure 3:
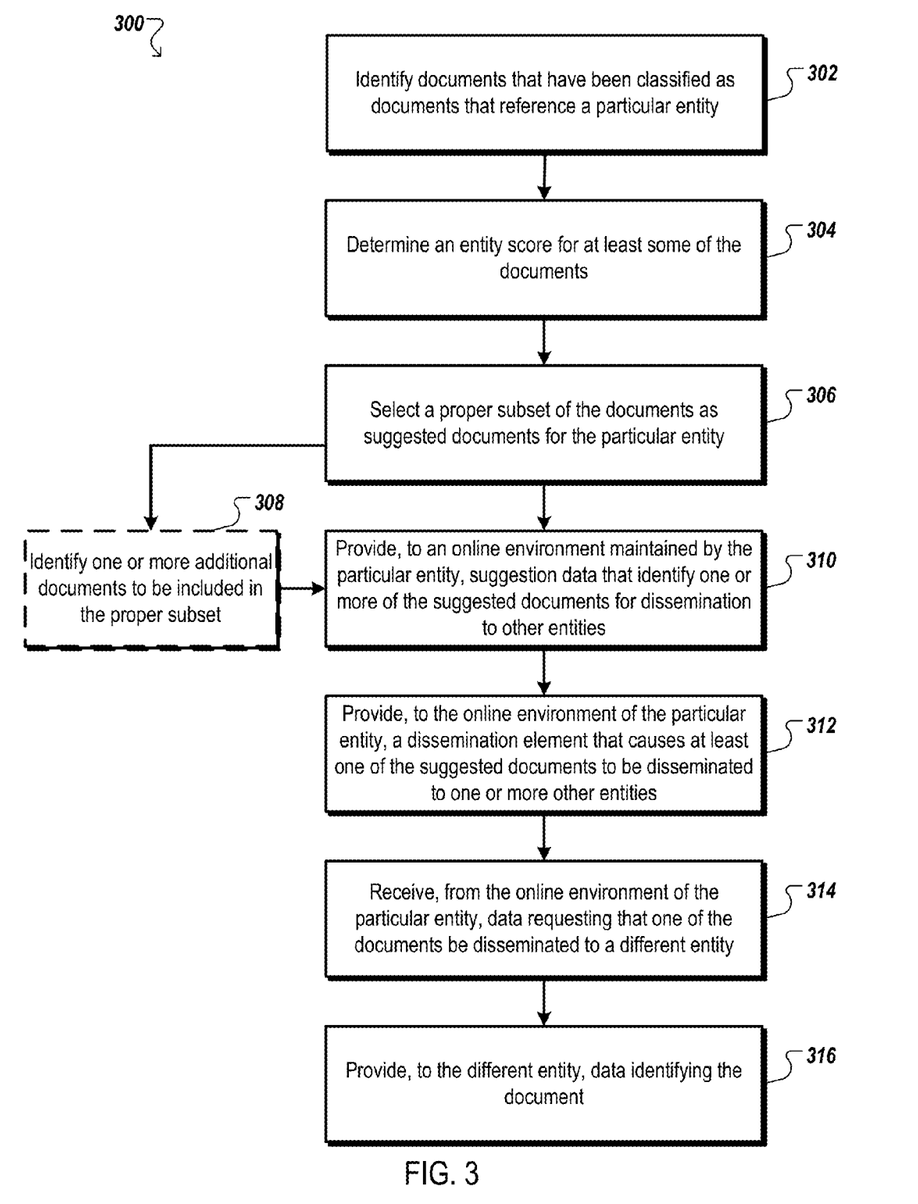
FIG. 3 is a flow chart of an example process for disseminating suggested documents for a particular entity.

FIG. 3 is a flow chart of an example process 300 for disseminating suggested documents for a particular entity. The process 300 is a process by which the suggested documents are selected based on the importance of the particular entity to the document and information identifying the suggested documents is provided to the particular entity. Upon request by the particular entity, information identifying one or more of the suggested documents is disseminated to other entities.

The process 300 can be implemented, for example, by the entity document suggestion apparatus 110 and/or the social network site 109 of FIG. 1. The process 300 can also be implemented as instructions stored on non-transitory computer storage medium such that execution of the instructions by data processing apparatus cause the data processing apparatus to perform the operations of the process 300.

Documents that have each been classified as documents that reference a particular entity are identified (302). In some implementations, the documents that reference a particular entity can be identified from a data base in which identifiers for particular entities are stored in association with (e.g., with a reference to) documents that have been determined to include a reference to the particular entity. For example, as discussed above with reference to FIG. 1, the documents that reference the particular entity can be identified from an entity-document index that is stored in a data store.

An entity score is determined for at least some of the documents (304). The entity score is a measure of importance of the particular entity to the document. The entity score can be based, for example, on how prominently the particular entity is mentioned or discussed in the document. For example, if a news article is primarily about a particular person, the news article may include multiple mentions of that particular person and/or very few to no mentions of other people. Therefore, in some implementations, the entity score may be determined, based at least in part, on a number of references to the particular entity that are included in the document. For example, the entity score can increase proportionally with the number of mentions of the particular entity (e.g., a number of instances of the name of the entity) in a document.

In some implementations, for a particular entity, the entity score for a document can be based on a number of references to the particular entity in the document relative to a number of references to other entities in the document. For example, a number of references to each of the particular entity and other entities (i.e., entities other than the particular entity) can be determined. These numbers can be used, for example, to determine one or more ratios of a number of particular entity mentions (e.g., the number of references to the particular entity) relative to a number of other entity mentions (e.g., the number of references to each of the other entities). The ratio can then be used to determine the entity score. For example, the entity score can be set equal to the value of this ratio, or this ratio can be used in conjunction with other values to compute the entity score.

In many documents, the location of a reference to a particular entity is considered indicative of the importance of the particular entity to the document. For example, if a news article is primarily about a particular person, it is likely that the news article will include the name of the particular person in the title or in a first few paragraphs of the article. In this example, the reference to the particular person is more prominent than references to other people that may also be mentioned or otherwise referenced by the article. Therefore, for a particular entity, the entity score for a document can be additionally, or alternatively, based on locations of the references to the particular entity in the document.

In some implementations, each reference to the particular entity can be weighted based on the location in the document at which the reference appears. For example, references to a particular entity in a title of a document can have a higher weight than references to the particular entity that are included in the body of the document or a citation that is included the document. Additionally, references to the particular entity that appear in a first threshold number of lines or paragraphs of the document can be assigned a higher weight than references to the particular entity that appear in subsequent lines or paragraphs of the document. These weights can then be used, for example, to compute a weighted sum (or some other function) that represents the entity score for the document.

Instead of, or in addition to, weighting each reference to the particular entity based on its location in the document, the entity score can be increased by a specified amount when references to the particular entity are determined to be located in specified areas of the document. For example, a title value (i.e., a value that is assigned when a reference to an entity appears in the title) can be added to (or otherwise used to increase) the entity score when a reference to the particular entity is included in the title of the document. Similarly, a prominence value can be added to (or otherwise used to increase) the entity score when a reference to the particular entity is included within a first number of lines or paragraphs after the beginning of the document. Thus, the entity score for the document can be based on both a number of particular entity mentions in the document and/or locations at which the entity mentions occur in the document.

In some implementations, the entity score for the document can also be based, in part, on a document score for the document. The document score can be based, for example, on an amount of traffic to a site hosting the document, whether the site hosting the document is a known trusted source of information, and on other information indicative of the quality of the document.

A proper subset of the documents is selected as suggested documents for dissemination by the particular entity (306). In some implementations, the proper subset of the documents that is selected as suggested documents for the particular entity are those documents having an entity score that meets an entity score threshold. Since the entity score is a measure of importance of the particular entity to the document, it may be that only those documents in which the particular is determined to be sufficiently important are selected as suggested documents for dissemination by the particular user. This sufficient level of importance can be specified using, for example, a threshold entity score. For example, documents having entity scores that meet the threshold entity score can be selected for inclusion in the proper subset of the documents.

In some implementations, the selection of the proper subset of documents as suggested documents for dissemination by the particular entity alternatively, or additionally, includes selection of one or more documents based on an information retrieval score for the documents relative to the particular entity. The information retrieval score is a value indicative of how well content of a document matches one or more terms. For example, the information retrieval score for a document can indicate, based on content of the document, how well the document matches the name of a particular entity. Information retrieval scores that are indicative of a level of match between a document and a name of (or another reference to) a particular entity are referred to as entity retrieval scores.

The entity retrieval scores can be obtained, for example, from a search system or another data processing apparatus that is configured to compute information retrieval scores. For example, the name of the particular entity and references to one or more documents can be provided to the search system, which can then respond by providing the entity retrieval scores for the documents. Entity retrieval scores can also be obtained from an information retrieval score data store in which the entity retrieval scores are stored.

In some implementations, the proper subset is selected to include one or more documents having entity retrieval scores, for the particular entity, that meet an entity retrieval score threshold. The entity retrieval score threshold is a specified entity retrieval score at which a document is deemed to be sufficiently relevant to the particular entity. Therefore, when a particular document has an entity retrieval score, for a particular entity, that meets (e.g., equals or exceeds) the entity retrieval score threshold, the document can be included in the proper subset of documents that are selected as suggested documents for dissemination by the particular entity for the documents, one or more documents having an entity retrieval score for the particular entity, that meets the entity retrieval score threshold.

In some implementations, one or more additional documents that are not included in the proper subset of documents are optionally identified for inclusion in the proper subset of documents (308). The one or more additional documents can be identified, for example, based on one or more of whether the document is hosted by a trusted site, whether the particular entity is a primary subject of the document, whether the title of the document includes a reference to the particular entity, and/or based on a popularity of the document.

The one or more additional documents can be included in the proper subset, for example, when the proper subset includes fewer than a threshold number of documents after selecting, for inclusion in the proper subset, those documents having an entity retrieval score that meets the entity retrieval score threshold and/or after selecting those documents having an entity score that meets the entity score threshold.

The selection of the one or more additional documents can be performed, for example, by identifying, from the documents that reference the particular entity, an additional document that is not included in the proper subset of documents. Then the additional document can be analyzed to determine whether the additional document is eligible for inclusion in the proper subset.

For example, assume that it is determined that the additional document is hosted by a site that has been classified as a trusted site, and it is further determined that the particular entity is a primary subject of the additional document. Further assume that based on these determinations, the additional document is eligible to be included in the proper subset of documents. Thus, in this example, the additional document can be included in the proper subset of documents based on the determination that the document is hosted by a trusted site and that the particular entity is a primary subject of the document.

A trusted site is a website that has been classified as trusted based, at least in part, on the quality of the documents that are hosted by the website. For example, if an analysis of documents hosted by the website reveals that the documents provided by the website are generally well formatted, include a sufficient amount of original content, do not include content that is deemed inappropriate, and/or are linked to by more than a threshold number of other websites, the website may be classified as a trusted website. A list of trusted websites can be maintained in a data store, such that the determination that a particular document is hosted by a trusted website can be performed by identifying which website hosts the particular document and then determining that the identified website is included in the list of trusted websites.

In some implementations, the determination that the particular entity is a primary subject of the document can be performed by analyzing the number of particular entity mentions in the document, the number of other entity mentions in the document, and/or locations of the particular entity mentions and/or other entity mentions. For example, if one of the particular entity mentions is located in the title of a particular document and/or the number of particular entity mentions in the document is greater than entity mentions for any other entity, then the primary subject of the document can be considered to be the particular entity. In some implementations, the particular document can be included in the proper subset in response to a determination that the particular entity is referenced by a title of the particular document, irrespective of whether the reference is hosted by a trusted site.

Alternatively, or additionally, an additional document that is not included in the proper subset can be deemed eligible for inclusion in the proper subset based on the popularity of the document. In some implementations, the popularity of a document can be evaluated based on a number of user requests for the document. For example, a first document that is requested by more users than a second document is considered more popular than the second document. A document that is sufficiently popular may be included in the proper subset of documents even though that document may not have been eligible for inclusion in the proper subset based on its entity score or its entity retrieval score.

For example, assume that an additional document that is not included in the proper subset is identified among the documents that include a reference to the particular entity. Further assume that this additional document has been requested by twice as many users (or some other amount of users) than one or more other documents that are included in the proper subset. In this example, the additional document can be considered more popular than at least some of the documents in the proper subset, such that the additional document may be included in the proper subset.

In some implementations, the determination of whether a particular document will be included in the proper subset can be based on a comparison of a number of user requests for the document over a specified period of time to a threshold number of user requests. For example, a number of user requests for the document over a last week (or another period of time) can be compared to a threshold number of users requests for a week (or another period of time). If the number of user requests meets the threshold number of user requests, the document can be included in the proper subset of documents.

In some implementations, the number of user requests for a documents is based on user requests that were submitted by any user, while in some implementations, the number of user requests is determined using only those user requests that were submitted by users that are within n-degrees of separation of the particular user (where n is an integer). For example, assume that user 1 and user 2 have identified each other as connections or friends in a social network. Further assume that user 2 has identified user 3 as a connection or friend, while user 1 has not identified user 3 as a connection or friend. In this example, user 3 can be considered to be two steps away (i.e., separated by two degrees) from user 1. In this example, if the number of user requests for a document about user 1 were based only on those user requests from users that were within two degrees of separation of user 1, then user requests that were submitted by each of user 2 and user 3 would be used to determine the number of user requests for the document since each of user 2 and user 3 are within two degrees of separation of user 1.

In some implementations, the determination of whether a particular document will be included in the proper subset is based, at least in part, on a traffic spike score for the document. The traffic spike score for a document is a value that indicative of a variance in the number of user requests for the document over a specified period. For example, a document that experiences a large increase in the number of user requests for a short period of time (e.g., one day), and then experiences a relatively constant lower number of requests over a longer period of time (e.g., one week, one month, or one year) will have a higher traffic spike score than another document that does not experience a short (or temporary) increase in the number of user requests.

In some implementations, the value of the traffic spike score for a document can be based on a maximum change (or some other measure of change) in the number of user requests for the document over a specified period. For example, assume that the number of user requests for a particular document on a particular day was twice the number of user requests for the document on the day preceding the particular day and/or a following day. Further assume that the 100% increase was the largest change in user requests for the document over a one day period. In this example, the traffic spike score for this document can be set to 2.0 indicating that the document has experienced a two-fold increase in user requests over a one day period.

A traffic spike (i.e., an increase in user requests over a specified period) for a document is an indication that the document that relates to a particular significant event that occurred (or was reported) near the time of the traffic spike. Thus, documents that have a high traffic spike score and reference a particular entity may be documents that the particular entity would want to disseminate to other entities. Accordingly, documents that are determined to have at least a threshold traffic spike score can be included in the proper subset of documents for the particular entity.

Note that one or more of the attributes that have been described for determining whether to include an additional document in the proper subset of documents can also, or alternatively, be used to compute the entity scores described with reference to operation 304. For example, values (e.g., weights) can be assigned to each of these criteria such that a weighted sum (or another function) can be used to compute the entity score for a document based on the attributes of the document.

Suggestion data that identify one or more of the suggested documents are provided to an online environment maintained by the particular entity (310). In some implementations, the online environment is considered maintained by the particular entity based on the particular controlling content that is presented in the online environment and/or the particular user exercising some exclusive control over the online environment. For example, a social environment for a particular user can be considered to be maintained by the particular user based on the particular user being able to allow some users to view content that the particular user uploads to the social environment, while also being able to exclude other users from being able to view some or all of the content.

As discussed above with reference to FIGS. 2A and 2B, the suggestion data that are provided can cause identifiers of the suggested documents to be presented on a social environment page for the particular user. The suggestion data can also cause presentation of text or other content specifying that the suggested documents reference the particular user and/or content suggesting that the particular user disseminate information about the documents to other online environments that are maintained by other entities.

The suggestion data can identify each document that is included in the proper subset. Alternatively, the documents that are identified by the suggestion data may be those documents from the proper subset for which the particular user is considered to be more relevant than the remaining documents in the proper subset. In some implementations, an entity ranking of the documents can be performed based on a weighted combination of values associated with the attributes discussed above. For example, the documents can be ranked based on a weighted combination (or another function) of one or more of their respective entity scores, entity retrieval scores, and/or whether the document has any of the attributes or combinations of attributes discussed above with reference to an additional document being included in the proper subset of documents. Once ranked, a specified number of the highest ranked documents can be selected as the suggested documents to be identified by the suggestion data.

The set of documents that are selected to be referenced by the suggestion data may include multiple documents from a same network path (e.g., a same domain). When multiple documents in the set are determined to be from a same network path, the suggestion data that are provided to the online environment can specify (or link to) the network path instead of, or in addition to, identifying the individual documents.

The proper subset of documents may include multiple documents that each are each eligible to be referenced by the suggestion data (e.g., based on the entity scores) and that have a same or similar document date. For example, assume that four documents have a same entity score. Further assume that two of the documents in the proper subset were both indexed by web crawlers on the same date, while a third document in the proper subset was indexed one month after the first two documents, and a fourth document was indexed two months after the first two documents. In this example, the first two documents that were indexed on the same date will have a same document date, while the third document will have a document date that is one month later than the first two documents, and the fourth document will have a document date that is 2 months after the first two documents.

Now assume, for purposes of example, that only three documents will be identified by the suggestion data that are provided, such that all four documents will not be identified by the suggestion data. In some implementations, the three documents that will be identified by the suggestion data are selected in a manner that facilitates temporal diversity among the document dates for the identified documents. For example, the three documents that are selected can be the third document, the fourth document, and one of the first two documents, since the first two documents have the same document date. Selecting the documents in a manner that facilitates temporal diversity among the document dates, which can increase the likelihood that the documents will refer to different events. For example, the likelihood that two documents that reference a same entity will discuss a same event is higher for two documents that have a same document date relative to the likelihood that two documents having different document dates discuss a same event.

A dissemination element that causes at least one of the suggested documents to be disseminated to one or more other entities is provided to the online environment of the particular entity (312). As discussed above with reference to FIGS. 2A and 2B, the dissemination element can be a user interface with which a particular user of a social network can interact to disseminate one or more suggested documents to one or more other entities.

Data requesting that information identifying one or more of the suggested documents be disseminated to a different entity are received from the particular entity (314). The data requesting dissemination of the information identifying the one or more suggested documents can be received, for example, in response to the particular user interacting with the dissemination element. The data can be received, for example, by the entity suggestion apparatus and/or a publisher of the social network website.

Data identifying the suggested document that was disseminated by the particular entity are provided to the different entity (316). As described with reference to FIGS. 2A, and 2B, the data can be provided, for example, to a social environment of the different entity, and cause an identifier for the suggested document to be presented in the social environment of the different entity.

The operations, methods, and systems described above refer to suggesting documents to users of a social network website for purposes of example. These and similar operations can also be used in other online environments. For example, the operations described above can be implemented in a manner that allows a particular user to monitor documents that mention the particular user, and alert the user when one of these documents is included in the proper subset. Similarly, the techniques described above could be implemented as part of a search environment to select a set of search results to provide in response to a search query that is determined to reference a particular entity.

Figure 4:
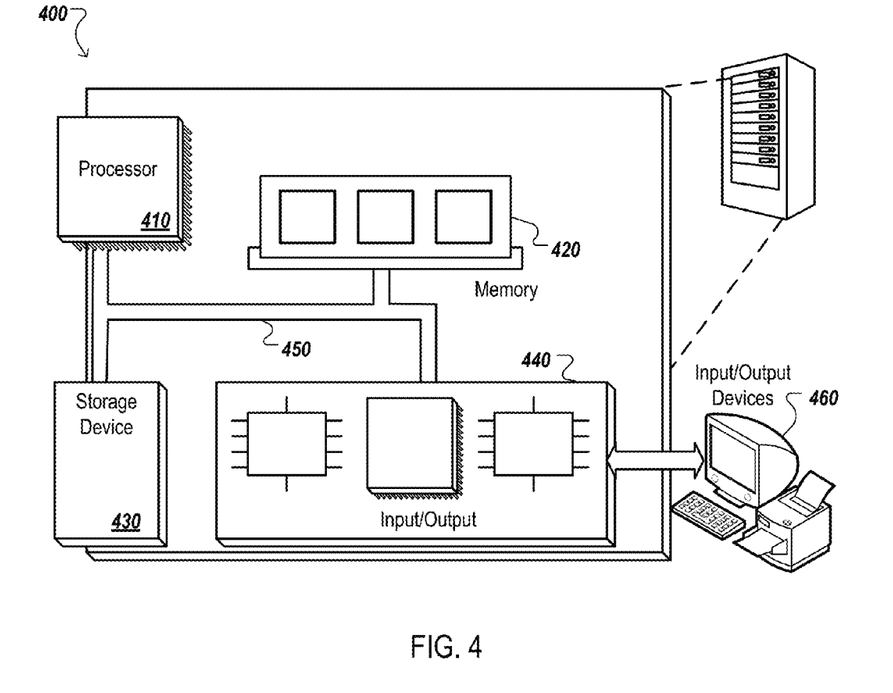
FIG. 4 is block diagram of an example computer system.

FIG. 4 is block diagram of an example computer system 400 that can be used to perform operations described above.

The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying, by a data processing apparatus, a plurality of documents that have each been classified as documents that reference a particular member of a social network, the identification being independent of a request by the member of the social network;
   determining, for each of at least some of the plurality of documents and by the data processing apparatus, an entity score specifying a measure of importance of the particular member to the document, the entity score being determined, based at least in part, on a number of references in the document to the particular member, the references including instances of a name of the particular member;
   selecting, as a set of suggested documents for the particular member, a proper subset of the documents from the plurality of documents that have at least a threshold entity score;
   identifying an additional document that was not eligible for inclusion in the set of suggested documents based on the entity score for the additional document being less than the threshold entity score, wherein the additional document references the particular member;
   determining, by the data processing apparatus, that the additional document has a traffic spike score that meets a threshold traffic spike score, the traffic spike score for the additional document being a value determined based on a variance of user requests for the additional document over one or more specified time periods;
   including the additional document in the set of suggested documents based on the determination that the traffic spike score meets the threshold traffic spike score;
   providing, by the data processing apparatus, data that identify, in a social network page of the particular member, one or more documents from the set of suggested documents for dissemination, by the particular member, to other members of the social network; and
   providing, in the social network page of the particular member, a dissemination element that, upon interaction with the dissemination element, causes at least one of the suggested documents to be disseminated to one or more other members of the social network.

2. The method of claim 1, wherein determining an entity score comprises:
for each of one or more of the documents:
determining locations of the references to the particular member in the document; and
determining the entity score based on the number of references and the locations of the references.

3. The method of claim 1, wherein determining the entity score comprises:
for at least one of the documents:
determining a first number of the references to the particular member that are included in the document;
determining a second number of references to other entities that are included in the document; and
determining, for the particular member, the entity score of the document based on a function of the first number and the second number.

4. The method of claim 1, further comprising:
identifying a second additional document that is not included in the proper subset of documents;
determining that the second additional document is hosted by a website that has been classified as a trusted site based, at least in part, on a quality of documents hosted by the site;
determining, based on the references to the particular member that are included in the second additional document, that the particular member is a primary subject of the second additional document; and
including the second additional document in the proper subset of documents, the inclusion being performed based on the particular member being a primary subject of the second additional document and based on the second additional document being hosted by the trusted site.

5. The method of claim 1, further comprising:
identifying a second additional document that is not included in the proper subset of documents;
determining that a title of the additional document includes a reference to the particular member; and
including the second additional document in the proper subset of documents, the inclusion being performed based on the determination that the title includes the reference to the particular member.

6. The method of claim 1, further comprising:
obtaining, for each of one or more of the plurality of documents, an information retrieval score for the document relative to the particular member;
identifying a particular document for which the information retrieval score meets an information retrieval threshold; and
including the particular document in the proper subset of documents, the inclusion being performed based on the information retrieval score meeting the information retrieval threshold.

7. The method of claim 1, further comprising:
determining that two of the documents form the plurality of documents each have a matching document date;
determining, based on the entity scores for the two documents, that each of the two documents are eligible for inclusion in the proper subset; and
including, based on the documents having a matching document date, only one of the two documents in the proper subset of documents.

8. A computer storage medium encoded with a computer program, the program comprising instructions that when executed by data processing apparatus cause the data processing apparatus to perform operations comprising:
identifying a plurality of documents that have each been classified as documents that reference a particular member of a social network, the identification being independent of a request by the member of the social network;
determining, for each of at least some of the plurality of documents, an entity score specifying a measure of importance of the particular member to the document, the entity score being determined, based at least in part, on a number of references in the document to the particular member, the references including instances of a name of the particular member;
selecting, as a set of suggested documents for the particular member, a proper subset of the documents from the plurality of documents that have at least a threshold entity score;
identifying an additional document that was not eligible for inclusion in the set of suggested documents based on the entity score for the additional document being less than the threshold entity score, wherein the additional document references the particular member;
determining that the additional document has a traffic spike score that meets a threshold traffic spike score, the traffic spike score for the additional document being a value determined based on a variance of user requests for the additional document over one or more specified time periods;
including the additional document in the set of suggested documents based on the determination that the traffic spike score meets the threshold traffic spike score;
providing data that identify, in a social network page of the particular member, one or more documents from the set of suggested documents for dissemination, by the particular member, to other members of the social network; and
providing, in the social network page of the particular member, a dissemination element that, upon interaction with the dissemination element, causes at least one of the suggested documents to be disseminated to one or more other members of the social network.

9. The computer storage medium of claim 8, wherein determining an entity score comprises:
for each of one or more of the documents:
determining locations of the references to the particular member in the document; and
determining the entity score based on the number of references and the locations of the references.

10. The computer storage medium of claim 8, wherein determining the entity score comprises:
for at least one of the documents:
determining a first number of the references to the particular member that are included in the document;
determining a second number of references to other entities that are included in the document; and
determining, for the particular member, the entity score of the document based on a function of the first number and the second number.

11. The computer storage medium of claim 8, wherein the instructions cause the data processing apparatus to perform operations comprising:
identifying a second additional document that is not included in the proper subset of documents;
determining that the second additional document is hosted by a website that has been classified as a trusted site based, at least in part, on a quality of documents hosted by the site;

determining, based on the references to the particular member that are included in the second additional document, that the particular member is a primary subject of the second additional document; and including the second additional document in the proper subset of documents, the inclusion being performed based on the particular member being a primary subject of the second additional document and based on the second additional document being hosted by the trusted site.

12. The computer storage medium of claim 8, wherein the instructions cause the data processing apparatus to perform operations comprising:

identifying a second additional document that is not included in the proper subset of documents;

determining that a title of the additional document includes a reference to the particular member; and including the second additional document in the proper subset of documents, the inclusion being performed based on the determination that the title includes the reference to the particular member.

13. The computer storage medium of claim 8, wherein the instructions cause the data processing apparatus to perform operations comprising:

obtaining, for each of one or more of the plurality of documents, an information retrieval score for the document relative to the particular member;

identifying a particular document for which the information retrieval score meets an information retrieval threshold; and including the particular document in the proper subset of documents, the inclusion being performed based on the information retrieval score meeting the information retrieval threshold.

14. The computer storage medium of claim 8, wherein the instructions cause the data processing apparatus to perform operations comprising:

determining that two of the documents form the plurality of documents each have a matching document date;

determining, based on the entity scores for the two documents, that each of the two documents are eligible for inclusion in the proper subset; and including, based on the documents having a matching document date, only one of the two documents in the proper subset of documents.

15. A system comprising:

a data store storing data referencing a plurality of documents that have each been classified as documents that reference a particular member of a social network classification being independent of a request by the member of the social network;

one or more computers coupled to the data store, the one or more computers including instructions that upon execution cause the one or more computers to perform operations comprising:

determining, for each of at least some of the plurality of documents, an entity score specifying a measure of importance of the particular member to the document, the entity score being determined, based at least in part, on a number of references in the document to the particular member, the references including instances of a name of the particular member;

selecting, as a set of suggested documents for the particular member, a proper subset of the documents from the plurality of documents that have at least a threshold entity score;

identifying an additional document that was not eligible for inclusion in the set of suggested documents based on the entity score for the additional document being less than the threshold entity score, wherein the additional document references the particular member;

determining that the additional document has a traffic spike score that meets a threshold traffic spike score, the traffic spike score for the additional document being a value determined based on a variance of user requests for the additional document over one or more specified time periods;

including the additional document in the set of suggested documents based on the determination that the traffic spike score meets the threshold traffic spike score;

providing data that identify, in a social network page of the particular member, one or more documents from the set of suggested documents for dissemination, by the particular member, to other members of the social network; and providing, in the social network page of the particular member, a dissemination element that, upon interaction with the dissemination element, causes at least one of the suggested documents to be disseminated to one or more other members of the social network.

16. The system of claim 15, wherein determining an entity score comprises:

for each of one or more of the documents:
determining locations of the references to the particular member in the document; and
determining the entity score based on the number of references and the locations of the references.

17. The system of claim 15, wherein determining the entity score comprises:

for at least one of the documents:
determining a first number of the references to the particular member that are included in the document;
determining a second number of references to other entities that are included in the document; and
determining, for the particular member, the entity score of the document based on a function of the first number and the second number.

18. The system of claim 15, wherein the instructions cause the one or more computers to perform operations comprising:

identifying a second additional document that is not included in the proper subset of documents;

determining that the second additional document is hosted by a website that has been classified as a trusted site based, at least in part, on a quality of documents hosted by the site;

determining, based on the references to the particular member that are included in the second additional document, that the particular member is a primary subject of the second additional document; and including the second additional document in the proper subset of documents, the inclusion being performed based on the particular member being a primary subject of the second additional document and based on the second additional document being hosted by the trusted site.

19. The system of claim 15, wherein the instructions cause the one or more computers to perform operations comprising:

identifying a second additional document that is not included in the proper subset of documents;

determining that a title of the additional document includes a reference to the particular member; and including the second additional document in the proper subset of documents, the inclusion being performed based on the determination that the title includes the reference to the particular member.

20. The system of claim 15, wherein the instructions cause the one or more computers to perform operations comprising:
- obtaining, for each of one or more of the plurality of documents, an information retrieval score for the document relative to the particular member;
- identifying a particular document for which the information retrieval score meets an information retrieval threshold; and
- including the particular document in the proper subset of documents, the inclusion being performed based on the information retrieval score meeting the information retrieval threshold.

21. The system of claim 15, wherein the instructions cause the one or more computers to perform operations comprising:
- determining that two of the documents form the plurality of documents each have a matching document date;
- determining, based on the entity scores for the two documents, that each of the two documents are eligible for inclusion in the proper subset; and
- including, based on the documents having a matching document date, only one of the two documents in the proper subset of documents.

* * * * *